United States Patent
Smith et al.

(10) Patent No.: US 6,246,483 B1
(45) Date of Patent: Jun. 12, 2001

(54) APPARATUS AND METHOD FOR SHEAROGRAPHIC INSPECTION AND NON-DESTRUCTIVE TESTING OF ARTICLES IN A VACUUM CHAMBER

(75) Inventors: John P Smith, Preston; Phillip L Salter; Steve C J Parker, both of Bristol, all of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/453,573

(22) Filed: Dec. 2, 1999

Related U.S. Application Data

(63) Continuation of application No. PCT/GB99/02553, filed on Aug. 3, 1999.

(30) Foreign Application Priority Data

Jan. 8, 1998 (GB) .................................................. 9816735

(51) Int. Cl.[7] ..................................................... G01B 9/02
(52) U.S. Cl. .......................................... 356/520; 356/35.5
(58) Field of Search .................................... 356/353, 360, 356/35.5; 73/800, 802

(56) References Cited

U.S. PATENT DOCUMENTS

| | | | |
|---|---|---|---|
| 4,744,659 | 5/1988 | Kitabayashi | 356/353 |
| 5,094,528 | 3/1992 | Tyson, II et al. | |
| 5,146,293 | 9/1992 | Mercer | |
| 5,257,088 | 10/1993 | Tyson, II et al. | 356/353 |
| 5,257,089 * | 10/1993 | Stetson | 356/353 |
| 5,481,356 | 1/1996 | Pouet et al. | |
| 5,493,398 * | 2/1996 | Pfister | 356/360 |
| 6,031,602 * | 2/2000 | Parker et al. | 356/353 |

FOREIGN PATENT DOCUMENTS

| | | |
|---|---|---|
| 42 31 578 A1 | 3/1994 | (DE) . |
| 2307550 | 5/1997 | (GB) . |
| 2324859 | 4/1998 | (GB) . |
| WO 84/01998 | 5/1984 | (WO) . |

OTHER PUBLICATIONS

Speckle techniques for material testing, Huang et al, IEEE, 1995, pp 1–6.*

* cited by examiner

Primary Examiner—Samuel A. Turner
(74) Attorney, Agent, or Firm—Nixon & Vanderhye P.C.

(57) ABSTRACT

Disclosed is an apparatus and method for inspecting or testing a sample using shearography techniques. A laser shearing interferometer includes: a source of coherent radiation, a line generator producing a line of coherent radiation from said source, a line scanner scans the line of coherent radiation over the sample, a shearing element generates two laterally displaced images of the sample, and phase stepper or ramper steps or ramps the phase of one of the two images. A video camera views images of the sample and provides corresponding video output signals. An image processor receives the video output signals and extracts therefrom the frame rate of the camera in substantially realtime. A signal generator provides the stepper and the line scanner, a signal substantially in phase with the frame rate of the camera, a decoder is used for phase extraction and a vacuum chamber contains the laser shearing interferometer and the sample under test. A pressure control varies the pressure within the vacuum chamber between several predetermined pressure values and a control unit interfaces and synchronizes the processor, the signal generator, the decoder and the pressure control.

12 Claims, 3 Drawing Sheets

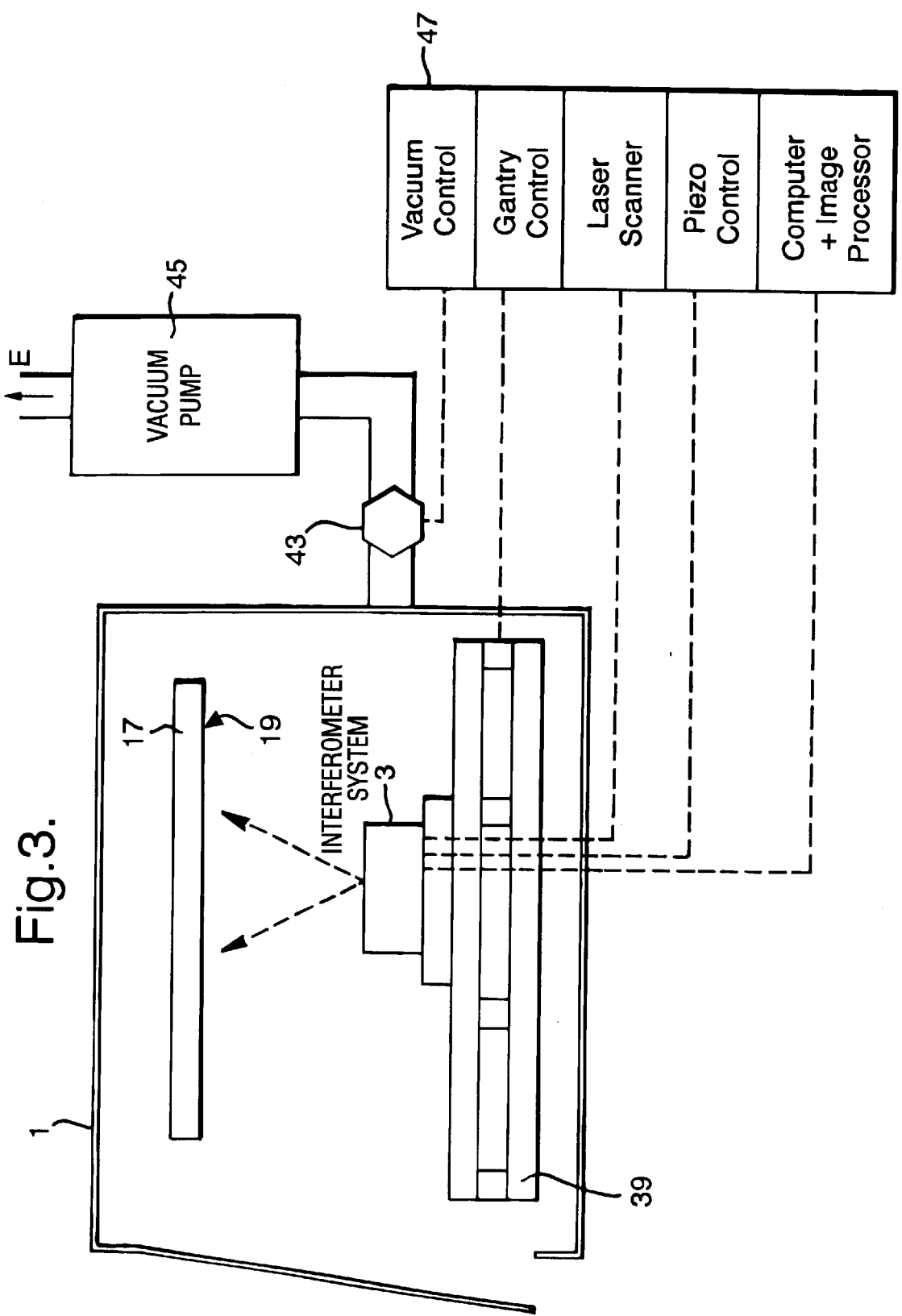

US 6,246,483 B1

APPARATUS AND METHOD FOR SHEAROGRAPHIC INSPECTION AND NON-DESTRUCTIVE TESTING OF ARTICLES IN A VACUUM CHAMBER

This application is a continuation of PCT/GB99/02653 filed Aug. 3, 1999.

BACKGROUND OF THE INVENTION

1. Field of the Invention

This invention relates to an apparatus and method for inspecting and testing a sample, such as an aircraft skin panel, by optical metrology and is particularly, but not exclusively, concerned with such method and apparatus applicable to optical non-destructive testing by shearography for aerospace components.

2. Discussion of Prior Art

Coherent optical techniques such as holography, interferometry, electronic speckle pattern interferometry (ESPI), speckle interferometry, particle image velocimetry (PIV) and shearography are currently being utilised for applications such as non-destructive testing (NDT), vibration analysis; object contouring, stress and strain measurement, fatigue testing, deformation analysis and fluid flow diagnosis. All these techniques have associated drawbacks with performance being to some extent a trade-off against specific disadvantages inherent in the individual techniques.

For example shearograpy has high sensitivity and tolerance to environmental noise but known NDT techniques involving shearography are of limited application because of difficulties in inspecting large areas due to inefficiencies in the laser power available and optical beam expansion and delivery systems. Additional problems are encountered with a relatively low signal to noise ratio.

A shearography system works by generating two laterally displaced images of a test sample. In practice this is achieved using a shearing element of which there are many variants, and imaging optics. When the sample is illuminated using coherent radiation such as visible radiation from a laser, these twin images are modulated by a speckled pattern due to the high coherence of the light. These two images interfere to form a macroscopic speckle pattern, which may be recorded electronically using a charge couple device (CCD) and a frame store. Interferometric images or fringe patterns may be generated by subtracting two speckle patterns of the sheared twin image where the second speckle pattern is recorded after the test specimen has been subjected to a stressing force, such as thermal, pressure or vibration. If an appropriate stressing force is applied defects in the structure of the sample are revealed by highly characteristic "figure of eight" fringes.

In practice the resulting fringe patterns are noisy due to spurious intensity variations and consequently the sensitivity of the shearography technique is reduced. Many techniques have been proposed for suppressing such noise by extracting the phase difference between the sheared images from the interferogrammes. One proposed technique, described in our UK patent application number 9708651.6, involves the phase stepping of the two laterally displaced images of the sample, by stepping the phase of one of the two images by $2\pi/3$ during each of the line scans of a camera so that successive lines are incremented in phase to encode temporally, as well as spatially, information about the sample within a single frame. The resulting image may be decoded by running a vertical convolution mask over the image. This technique has the advantages of suppressing a substantial proportion of noise whilst providing single frame analysis. A laser shearing interferometer suitable for providing such interferogramme images is disclosed in our UK patent application 9708651.6 and is further described below in the context of the present invention.

In known applications of shearography for non-destructive testing, a coherent light source is usually a split beam laser. Splitting of the beam allows a larger area of the sample to be tested, but in expanding the beam intensity of the light varies with radius of the circular beam. This variation in intensity of light incident on the sample being tested results in poor quality of the reflected images and hence poor quality interferogrammes.

Furthermore when the sample is to be tested under stress induced by temperature or pressure variations, the known methods generally require that the laser beam is delivered via a fibre optic cable into a sealed chamber containing the sample, and in which the pressure or temperature can be varied. The laser is generally situated outside of the sealed chamber as known lasers used in NDT are susceptible to variations in pressure and temperature changes and may not perform to the required standard when exposed to the temperature or pressure variations required for stressing the sample.

It is generally less desirable to use temperature variations to induce stress changes as it is usually difficult to keep the entire sample at the same required temperature and yet to be able to quickly and accurately alter the temperature in the chamber to a new value.

A known pressure variation stressing technique allows the pressure in a chamber to cycle between two pressure levels. Speckle pattern images are recorded at ambient pressure then again at a lower, pre-determined pressure level. An interferometric image is then generated by subtracting the speckle pattern images recorded at the two different pressures. This technique however can produce poor images if the sample undergoes vibration whilst either speckle pattern image is being recorded.

SUMMARY OF THE INVENTION

The present invention seeks to provide improved apparatus and methods for the NDT of articles using shearography, in which the articles are subject to pressure stressing to provide interferometric images.

According to a first aspect of the present invention, there is provided apparatus for inspecting or testing a sample using shearography techniques including:

a laser shearing interferometer including:

a source of coherent radiation, line generating means for producing a line of coherent radiation from said source, line scanning means for scanning said line of coherent radiation over said sample, shearing element means for generating two laterally displaced images of the sample, and phase stepping or ramping means for stepping or ramping the phase of one of the two images, and a video camera for viewing images of the sample and for providing corresponding video output signals, an image processor operable to receive the video output signals and to extract therefrom the frame rate of the camera in substantially realtime, signal generating means for providing to said stepping or ramping means and said line scanning means a signal substantially in phase with the frame rate of said camera, decoding means for phase unwrapping or extraction, a vacuum chamber for containing at least the laser shearing interferometer and sample, pressure control means capable of varying the pressure within the vacuum chamber between several pre-determined pressure values, and control unit means for interfacing and synchronising said processor, said signal generating means, said decoding means and said pressure control means.

Preferably said laser shearing interferometer is mounted on a movable gantry. Advantageously the movement of the movable gantry is controlled by the control unit.

The gantry may be adapted to operate in synchronisation with the pressure control means and the laser scanning means.

According to a second aspect of the present invention, there is provided a method for inspecting or testing a sample using shearography techniques using the apparatus described above and including the steps of:

illuminating said sample by using the line scanning means to scan a line of coherent radiation across the surface of the sample to generate, via the shearing element means, two laterally displaced images of the sample, phase stepping or ramping the phase of one of the two images during each of the line scans using the stepping or ramping means, observing and recording said phase stepped images by means of the video camera, whilst maintaining the scanning of a line and phase stepping of the images in symchronisation with the frame scan rate of the camera, pre-programming the control unit with a pressure versus time profile and indicating point of said profile when images should be recorded and processed, and using the control means for controlling and synchronising the pressure in the chamber, the scan rate of the line scanning means, the phase stepping means and the image processor, to provide a substantially real time dynamic image of the object under test on a monitor.

BRIEF DESCRIPTION OF THE DRAWINGS

For a better understanding of the present invention, and to show how the same may be carried into effect reference will now be made, by way of example, to the accompanying drawings in which:

FIG. 3 shows a diagrammatic representation of interfaces of apparatus according to the present invention.

FIG. 1 shows a vacuum chamber 1, in which is a laser shearing interferometer system 3 and an article to be inspected 17. The laser shearing interferometer system 3 comprises a laser 5 which is adapted to be capable of operating in a vacuum, a movable mirror 15, a charge coupled device (CCD) imaging camera 11 which may be used for shearography and for electronic speckle interferometry and which is capable of providing an output signal 21, and an interferometer 9. A line generator 7 is located adjacent the laser 5, for generating a line of coherent radiation 19. The line generator 7 can conveniently be a lasiris line scanner which is commercially available.

Figure 1:
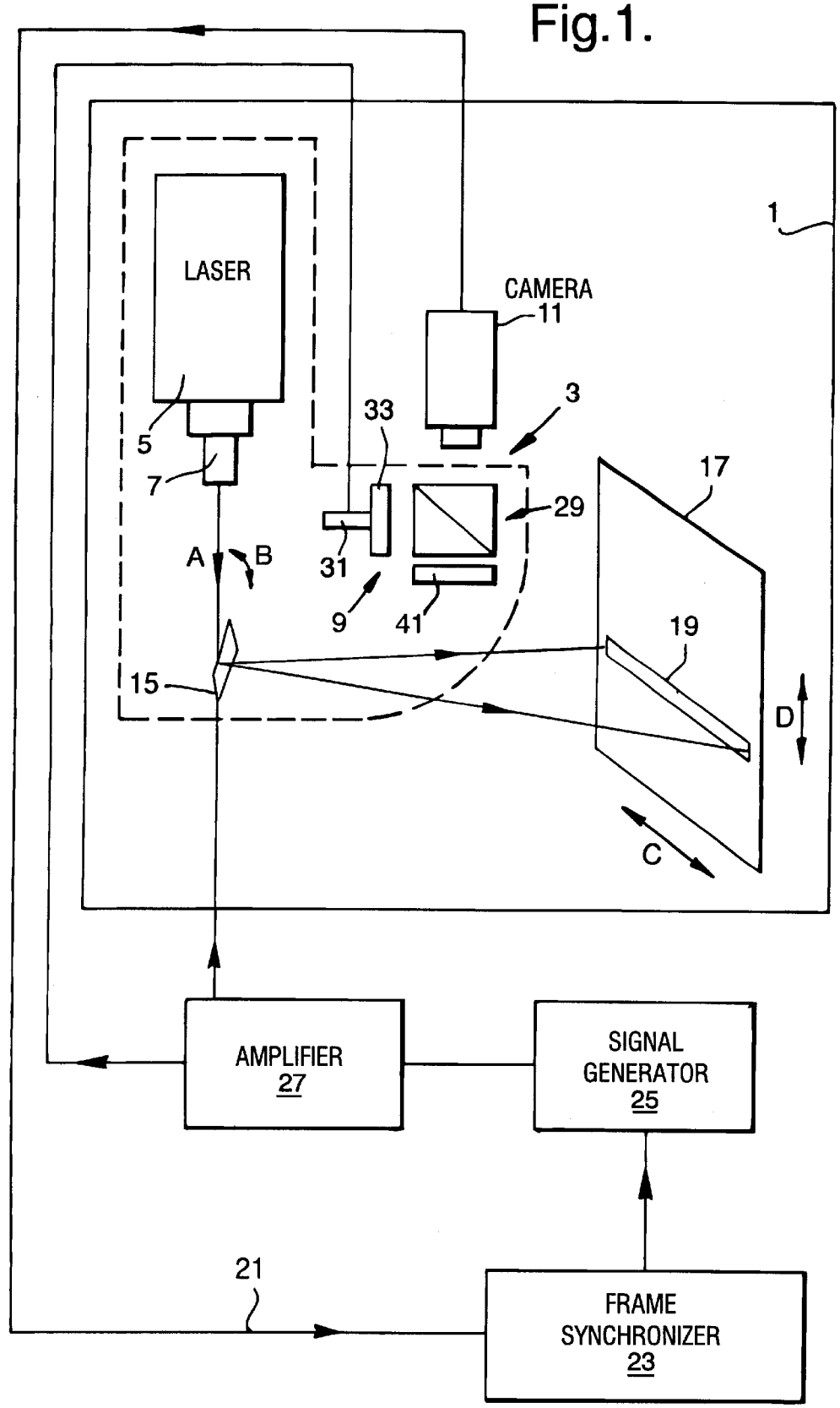
FIG. 1 shows a diagrammatic representation of apparatus according to one aspect of the present invention for inspecting or testing a sample by optical metrology utilising the method of the present invention.

The interferometer 9 comprises a movable mirror 33 which is attached to a PZT piezo electric transducer 31 for providing phase stepping. The interferometer 9 further comprises a tilted mirror 41 for enabling shearing, and a shearing element 29. Situated outside of the vacuum chamber 1 are a frame synchronising unit 23 for processing the output signal 21 from the CCD camera 11, and a triggered signal generator 25 and an amplifier 27, for providing and amplifying a signal to drive the movable mirror 15 and the transducer 31 in synchronism with the CCD camera 11.

Figure 2:
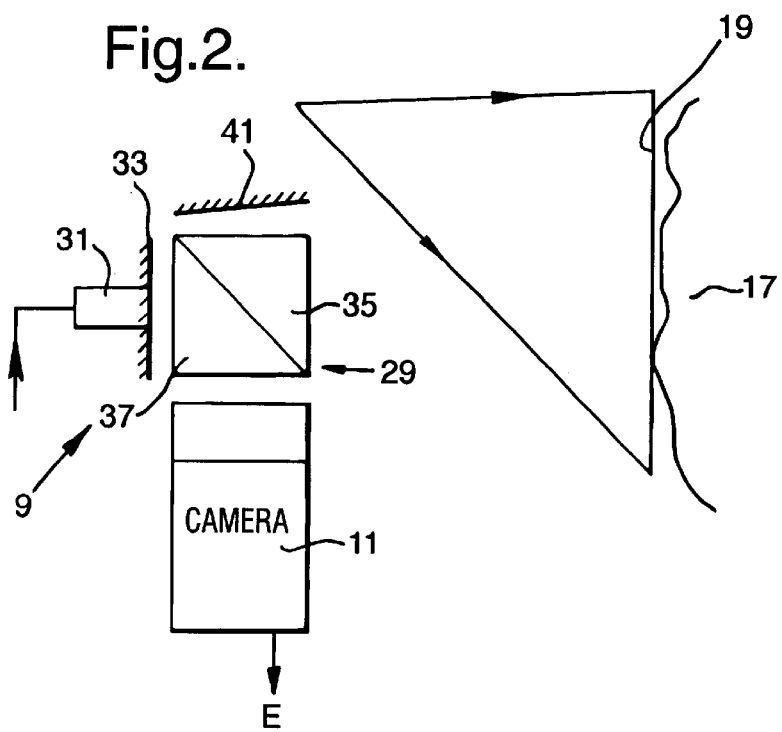
FIG. 2 shows a diagrammatic view to an enlarged scale of an interferometer for use in the method and apparatus of the present invention.

FIG. 2 shows the interferometer 9 in more detail. The shearing element 29 comprises two prisms 35 and 37 for receiving light reflected from the surface of the article 17 and for generating two laterally displaced images in the direction of the arrow E.

In operation, the article 17 is illuminated by scanning a line 19 of coherent radiation across the surface of the article 17. The coherent radiation is provided by the laser 5 operating via the line generator to generate the line 19. The beam from the line generator is directed along path A to fall on the movable mirror 15. The mirror 15 rotates backwards and forwards, as shown by the arrow B, to scan the line 19 up and down the article 17 in the direction of the arrow D. Light reflected from the surface of the article 17 falls on the shearing element 29. The CCD camera 11 is operable to view the article 17 via the shearing element 29, and provides an output signal 21. This is received by the frame synchronisation unit 23 which extracts the frame rate of the camera 11 which it uses to synchronise the rate at which the line of coherent radiation 19 is scanned across article 17 by the movable mirror 15. Thus the frame synchronisation unit 23 yields frame synchronising pulses which can be filtered to drive the movable mirror 15 directly so that the mirror 15 is synchronised to the camera output signal 21 to yield a stable image on a monitor. The filtered synchronising pulses trigger the signal generator 25 which provides signals which are amplified by amplifier 27 and which drives the mirror 15 and the transducer 31 in synchronism with the camera 11. As the transducer 31 receives the output signal from the amplifier 27 it expands or contracts accordingly, and causes the attached mirror 33 to move, thereby providing the required phase stepping. The resulting interferogrammes are decoded by processor using a vertical convolution mask technique, as described in our UK patent application number 9708651.6 and produce high quality images of the article 17 for identifying defects for viewing on a monitor.

FIG. 3 shows a laser shearing interferometer 3 located on a gantry 39, within a vacuum chamber 1. The laser shearing interferometer 3 produces and scans a line 19 over the surface of article 17, as described with reference to FIGS. 1 and 2. A vacuum pump 45 is connected to the vacuum chamber 1 via an electronic valve 43, arrow E showing direction of exhaust. A control unit 47, situated outside of the vacuum chamber 1 controls the movement of the gantry 39. Control unit 47 also comprises the frame synchronising unit 23, the signal generator 25 and the amplifier 27. The control unit 47 therefore takes the output signal 21 from the camera 11 and controls the synchronisation of the mirror 15 and the transducer 31. The number of phase steps is controlled by the number of different signals the signal generator 25 is programmed to send to the transducer 31. In this embodiment 5 phase steps are used to provide a satisfactory signal to noise ratio. The control unit also controls the electronic valve 43, thereby controlling the amount of air introduced to or removed from the vacuum chamber 1, and when this airflow takes place. Thus the control unit 47 is able to synchronise the complete operation of the NDT facility.

The control unit 47 is capable of being programmed to allow phase stepped images to be taken at various times, at various pressures during the test. The images are processed by the control unit and displayed on a monitor.

Figure 4:
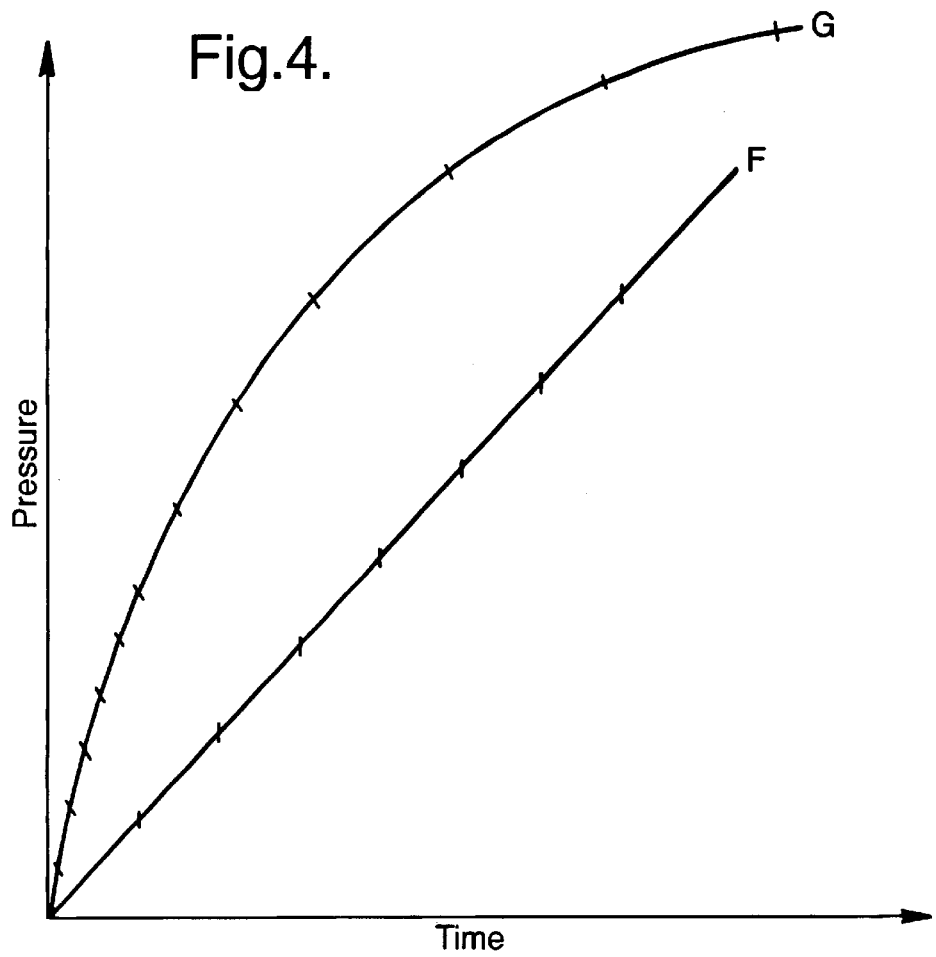
FIG. 4 shows a graph of pressure versus time for providing test profiles.

FIG. 4 shows a graph of pressure versus time, with two profiles F and G. These represent different profiles programmed into the control unit, for testing different articles or for varying the conditions under which articles are tested. For example, profile F shows a linear correlation between pressure and time, with the pressure being increased steadily and the points being marked at those times and corresponding pressures at which interferometric images are recorded. Profile G shows a rapid increase in pressure initially, during which time images are recorded with a very short time interval between them, followed by slower increase in pressure, with longer intervals between recorded images.

For any profile the pressure may be lowered and or raised depending on testing requirements. In this example when the control unit is programmed with profile F it controls the flow of air to or from the vacuum chamber during the time period of the profile. At each pre-determined point shown on the profile F the control unit 47 ensures that the camera 11 records 5 phase stepped sheared images, and that the phase stepping means (the transducer 31) and the line scanning means (the movable mirror 15) are operating in phase with the scan rate of the camera 11 to provide stable images to the monitor. Every set of 5 phase stepped sheared images are combined by the control unit into a single interferometric image which is decoded and displayed on the monitor, in real time. The second decoded interferometric image, recorded at the second point on the profile F, is combined in real time with the first interferometric image, to provide a dynamic image of the article being tested. The third interferometric image is combined with the result of a combination of the first and second images, and so on. This allows the user to see on the monitor a real time dynamic image of the state of the article being tested as the pressure is varied.

Recording images at various points upon a pressure curve allows the user to see when the object starts to react to the change in pressure, and by how much. Having several images recorded also means that if one is inaccurate, due to vibration of the laser or article for example, then the test will still provide accurate data from the other points and will not have to be repeated.

For large articles, the control unit controls the movement of the gantry on which the laser shearing interferometer is mounted, in synchronism with the pressure control valve and the rate of scan of the camera, so that images of the entire article may be scanned at the same pressure. This provides very quick and accurate means for testing large articles.

What is claimed is:

1. Apparatus for inspecting or testing a sample using shearography techniques including:
    a laser shearing interferometer including:
        a source of coherent radiation,
        line generating means for producing a line of coherent radiation from said source,
        line scanning means for scanning said line of coherent radiation over said sample,
        shearing element means for generating two laterally displaced images of the sample, and
        phase stepping or ramping means for stepping or ramping the phase of one of the two images, and
    a video camera for viewing images of the sample and for providing corresponding video output signals,
    an image processor operable to receive the video output signals and to extract therefrom the frame rate of the camera in substantially realtime, signal generating means for providing to said stepping or ramping means and said line scanning means a signal substantially in phase with the frame rate of said camera,
    decoding means for phase extraction,
    a vacuum chamber for containing at least the laser shearing interferometer and sample,
    pressure control means capable of varying the pressure within the vacuum chamber between several pre-determined pressure values, and
    control unit means for interfacing and synchronising said processor, said signal generating means, said decoding means and said pressure control means.

2. Apparatus for inspecting or testing a sample as claimed in claim 1 and wherein the laser shearing interferometer is mounted on a movable gantry.

3. Apparatus for inspecting or testing a sample as claimed in claim 2 and wherein the movement of the movable gantry is controlled by the control unit.

4. Apparatus for inspecting or testing a sample as claimed in claim 2 and wherein the gantry is adapted to operate in synchronisation with the pressure control means and the laser scanning means.

5. Apparatus for inspecting or testing a sample as claimed in claim 3 and wherein the gantry is adapted to operate in synchronization with the pressure control means and the laser scanning means.

6. A method for inspecting or testing a sample using shearography techniques including the steps of:
    locating said sample and a laser shearing interferometer in a vacuum chamber,
    illuminating said sample by using a line scanning means to scan a line of coherent radiation across the surface of the sample to generate, via a shearing element means, two laterally displaced images of the sample,
    phase stepping or ramping the phase of one of the two images during each of the line scans using a stepping or ramping means,
    observing and recording said phase stepped images by means of the video camera, whilst maintaining the scanning of a line and phase stepping of the images in synchronization with the frame scan rate of the camera,
    pre-programming the control unit with a pressure versus time profile and indicating points on said profile when images should be recorded and processed, and
    using the control means for controlling and synchronising the pressure in the chamber, the scan rate of the line scanning means, the phase stepping means and the image processor, to provide a substantially real time dynamic image of the object under test on a monitor.

7. Apparatus for inspecting or testing a sample using shearography techniques comprising:
    a laser shearing interferometer, said interferometer including:
        a source of coherent radiation;
        a line generator producing a line of coherent radiation from said source;
        a line scanner for scanning said line of coherent radiation over said sample;
        a shearing element generating two laterally displaced images of the sample, and
        a phase stepper stepping the phase of one of the two images; and a video camera, responsive to viewed images of the sample, for providing corresponding video output signals;

an image processor, responsive to the video output signals, extracting therefrom the frame rate of the camera in substantially realtime;

a signal generator for providing to said stepper and said line scanner a signal substantially in phase with the frame rate of said camera;

a decoder for phase extraction;

a vacuum chamber containing at least the laser shearing interferometer and said sample;

a pressure control varying the pressure within the vacuum chamber between several predetermined pressure values; and a control unit interfacing with and synchronizing said processor, said signal generator, said decoder and said pressure control.

8. Apparatus for inspecting or testing a sample as claimed in claim 7 and wherein the laser shearing interferometer is mounted on a movable gantry.

9. Apparatus for inspecting or testing a sample as claimed in claim 8 and wherein the movement of the movable gantry is controlled by the control unit.

10. Apparatus for inspecting or testing a sample as claimed in claim 9 and wherein the gantry is adapted to operate in synchronization with the pressure control means and the laser scanning means.

11. Apparatus for inspecting or testing a sample as claimed in claim 8 and wherein the gantry is adapted to operate in synchronization with the pressure control means and the laser scanning means.

12. A method for inspecting or testing a sample using shearography techniques in a vacuum chamber including the steps of:

locating said sample and a laser shearing interferometer in a vacuum chamber, illuminating said sample by using a line scanner to scan a line of coherent radiation across the surface of the sample to generate two laterally displaced images of the sample, phase stepping the phase of one of the two images during each of the line scans using a stepper, observing and recording said phase stepped images by a video camera, whilst maintaining the scanning of a line and phase stepping of the images in synchronization with the frame scan rate of the camera, pre-programming a vacuum chamber pressure control unit to indicate when images should be recorded and processed, and using the pressure control unit to control and synchronize pressure in the chamber, the scan rate of the line scanning means, the phase stepping means and the image processor, to provide a substantially real time dynamic image of the object under test on a monitor.

* * * * *